US012450145B2

United States Patent
Dasgupta et al.

(10) Patent No.: US 12,450,145 B2
(45) Date of Patent: Oct. 21, 2025

(54) ADVANCED SIMULATION MANAGEMENT TOOL FOR A MEDICAL RECORDS SYSTEM

(71) Applicant: CERNER INNOVATION, INC., Kansas City, KS (US)

(72) Inventors: Ranjan Dasgupta, Kolkata (IN); Arindam Das, Kolkata (IN); Suvendu Sekhar Mondal, Howrah (IN); Kanishka Basak, Kolkata (IN); Sudhabindu Sengupta, Kolkata (IN)

(73) Assignee: Cerner Innovation, Inc., Kansas City, MO (US)

( * ) Notice: Subject to any disclaimer, the term of this patent is extended or adjusted under 35 U.S.C. 154(b) by 588 days.

(21) Appl. No.: 17/324,718

(22) Filed: May 19, 2021

(65) Prior Publication Data
US 2022/0374328 A1   Nov. 24, 2022

(51) Int. Cl.
*G06F 11/34* (2006.01)
*G06F 11/30* (2006.01)

(52) U.S. Cl.
CPC ...... *G06F 11/3457* (2013.01); *G06F 11/3006* (2013.01); *G06F 11/3428* (2013.01)

(58) Field of Classification Search
CPC ............. G06F 11/3457; G06F 11/3006; G06F 11/3428; G06F 11/3664; G06F 11/3668; G06F 11/3409; G16H 10/60
See application file for complete search history.

(56) References Cited

U.S. PATENT DOCUMENTS

| | | | |
|---|---|---|---|
| 9,465,548 B1* | 10/2016 | Hrischuk | G06F 11/3447 |
| 10,558,507 B1* | 2/2020 | Das | G06F 9/465 |
| 10,915,437 B1* | 2/2021 | Arguelles | G06F 11/3688 |
| 11,561,889 B2* | 1/2023 | De Sousa Bispo | G06F 16/252 |
| 11,640,349 B2* | 5/2023 | Ho | G06F 11/3476 |
| | | | 717/135 |
| 2016/0352822 A1* | 12/2016 | Takatsu | H04L 67/1001 |
| 2017/0068608 A1* | 3/2017 | Covell | G06F 11/3409 |

(Continued)

OTHER PUBLICATIONS

Kiernan, A. ""Migration Through Value Added Services"—A Viable Approach to a Service Orientated Architecture for the medical domain?" [Thesis] University of Dublin, MS in Health Informatics [retrieved on Jun. 23, 2023] (Year: 2007).*

(Continued)

*Primary Examiner* — Emerson C Puente
*Assistant Examiner* — Alfred H B Wechselberger
(74) *Attorney, Agent, or Firm* — Invoke (57) ABSTRACT

Systems for testing computing devices of a medical records system using a simulated environment are provided. The simulated environment is generated by identifying transaction traffic over the network, where the transaction traffic comprises messages of different transaction types. A computing device is configured to output a simulated status by extrapolating a performance of the computing devices upon receiving a series of messages indicating the transaction types. The output of the computing device may indicate an error in the simulated environment where the performance of a computing device exceeds a performance threshold. Based on the error indication, transaction traffic can be diverted from the computing device to another computing device having performance capacity.

27 Claims, 7 Drawing Sheets

(56) References Cited

U.S. PATENT DOCUMENTS

2018/0373580 A1* 12/2018 Ertl ................ G06F 11/3433
2020/0050537 A1* 2/2020 Schmalz, Jr. ...... G06F 11/3672
2020/0099773 A1* 3/2020 Myers ............... H04L 67/34

OTHER PUBLICATIONS

Halili, E. "Apache JMeter: A practical beginner's guide to automated testing and performance measurement for your websites" Packt Publishing; ISBN 978-1-847192-95-0 [retrieved on Jul. 12, 2023] (Year: 2008).*

Ragupathy, M. "Long Short Term Memory Based Total Traffic Prediction for Container Load Balancing" Technical Disclosure Commons, Defensive Publications Series [retrieved on May 10, 2024]. Retrieved from <<https://www.tdcommons.org/dpubs_series/1158>> (Year: 2018).*

Munonye et al. "Evaluation of Data Storage Patterns in Microservices Archicture" 2020 IEEE 15th International Conference of System of Systems Engineering [retrieved on Dec. 28, 2024] (Year: 2020).*

Wang et al. "Design and Optimization of Traffic Balance Broker for Cloud-Based Telehealth Platform" 2013 IEEE/ACM 6th International Conference on Utility and Cloud Computing [retrieved on Jun. 27, 2025] (Year: 2013).*

* cited by examiner

ADVANCED SIMULATION MANAGEMENT TOOL FOR A MEDICAL RECORDS SYSTEM

BACKGROUND

Healthcare systems include networks of computing systems distributed across various locations. Many of these systems are responsible for different operational aspects of the healthcare systems, including processing transactions, such as opening a patient chart, creating an entry in a patient chart, closing the patient chart, discharging the patient, and so on.

SUMMARY

At a high level, aspects described herein relate to simulating a computing environment of a medical records system for testing the medical records system.

To simulate a computing environment for testing, a network of computing devices for a medical records system is identified. The network of computing devices is generally responsible for facilitating various transactions for entities using the medical records system, such as transaction types related to opening patient charts, making modifications to the charts, discharging patients, and so forth.

While the network of computing devices is communicating transaction traffic in the form of transaction messages over the network to facilitate the transactions, the performance of each of the computing devices can be determined by monitoring the communication traffic and identifying the relative performance, such as CPU (central processing unit) usage, physical memory usage and spikes, and the like.

Based on the performance of the computing devices, a simulated environment of the network can be generated. The simulated environment simulates the performance of the computing devices based on a transaction volume of the transaction messages, which make up the transaction traffic. For instance, based on monitoring a computing device of the network over a first timeframe, the performance of the computing device in response to various message volumes or rates, e.g., loads, is identified. In the simulated environment, an output indicating the performance of the computing device can be determined and provided based on a particular message volume or rate. In this way, it is possible to predict how the computing device will perform under different scenarios of message volumes without having to subject the computing device to an actual load in a live environment to identify its performance in response.

The simulated environment can be used to test the network of computing devices without overloading the network as it performs its general functions. To test the network, a series of messages that imitate a transaction type of the transaction traffic can be generated and provided to a computing device hosting the simulated environment. In response, the computing device outputs the simulated performance of the computing devices of the network, which indicates how the network would respond in an actual event. The message volume of the series of messages can be increased until an error in the network is identified in the simulated environment, such as a computing device experiencing a CPU usage or memory spike that is greater than a threshold value.

The errors identified in the simulated environment are predictors of errors that could occur if the computing devices were to experience a similar message volume during operation. Based on this, during operation of the network in a live environment, messages can be diverted from one computing device to another computing device having additional computational capacity to improve the overall performance of the network.

This summary is intended to introduce a selection of concepts in a simplified form that is further described in the Detailed Description section of this disclosure. The Summary is not intended to identify key or essential features of the claimed subject matter, nor is it intended to aid in determining the scope of the claimed subject matter. Additional objects, advantages, and novel features of the technology are included in the Detailed Description, and in part, will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Within medical records systems, there is generally a network of computing devices. These computing devices can be disparate in nature and facilitate transactions of the medical records systems. There are thousands of different types of transactions, ranging from opening a patient chart, adding information to a patient chart, scheduling appointments, discharging patients, ordering medications, billing, and so on. Many times, the various computing devices are configured to facilitate one or more of these transaction types by processing the transactions in accordance with computer instructions.

As with all computing systems, the computational capability of the network is limited. Additionally, due to the operational nature of medical records systems, different volumes of transactions associated with different transaction types vary over a timeframe. For instance, transaction types related to billing might occur in greater numbers at different points of a monthly billing cycle, while transaction types related to new patient intake might occur in greater numbers during the week and taper off over a weekend.

Because of this, computer devices experience different loads on their processors and memory. The complexity of the network combined with the fluctuations of transaction traffic associated with different transaction types generally leads to uneven loads across the network. In some cases, one computing device may experience a spike in message volume that causes a degradation of its performance or causes it to be unable to process the transaction at speeds great enough to continue smooth operation of the network. Overall, this can slow the network down or create issues that must be manually resolved.

To solve these problems, the technology of the present disclosure provides for generating a simulated computing environment for testing the computing system of a network for a medical records system. By generating a simulated computing environment, the computing devices of the network can be tested within the simulated environment without the need to test the network in its general operation within a live environment. One benefit of testing in the simulated environment is that load testing can be performed to identify errors without actually causing the error in the live environment, thus allowing corrective action to be taken before the live system ever experiences an error. This prevents some system failures or slowdowns that could be caused by unanticipated performance spikes in network traffic.

One example of the technology that achieves these benefits begins by identifying transaction traffic over a network of computing devices of a medical records system. Transaction traffic generally includes the messages across the network that are generated and sent to facilitate transactions of the medical records system. The amount of the transaction traffic generally relates to the transaction traffic volume. In general, the transaction traffic will comprise messages related to different transaction types, such as discharging a patient, opening a chart, and so on. Thus, the transaction traffic can comprise a plurality of transaction types, where each transaction type is associated with a portion of the transaction traffic volume.

Based on the identified transaction traffic over a first timeframe, a schedule corresponding to the transaction traffic volume can be generated. That is, the schedule may be generated by recording the transaction traffic volume for each of the transaction types and the times during which the transaction traffic volume for each of the transaction types occurred. This can be done for the first timeframe, such as a day or a month.

During the first timeframe of the transaction traffic, the performance of the computing devices within the network can be identified. Computing system performance may be measured in several ways. One method is to identify the CPU usage or the memory usage of the computing device. The performance for each of the computing devices of the network can be identified while the computing devices are processing transaction traffic, along with the transaction traffic volume that the computing devices are processing when the performance is identified.

A simulated computing environment can be generated using identified performance and transaction traffic volume during the first timeframe. To generate the simulated environment, a computing device can be configured to output a simulated status for the network or a computing device of the network. Initially, the simulated computing environment can be generated to output the simulated status based on the schedule determined for the first timeframe by outputting the performance determined when the computing devices are communicating the transaction traffic.

The computing device can also be generated to extrapolate the simulated performance at a specified transaction traffic volume or rate based on the identified performance and the transaction traffic during the first timeframe. Thus, by inputting a series of messages that imitate a particular transaction type, the output of the simulated computing environment provides the simulated performance of the computing device or network based on the message volume or rate of the series of messages.

The simulated computing environment can be used to test network performance or the performance of computing devices within the network. In some test scenarios, this includes a load test. The advantage of load testing within the simulated environment is that the performance of computing devices can be tested to threshold values, such as when the computing device begins to experience performance degradation or another error is experienced. This allows corrective action to be taken within the network without slowing down or causing errors within the network during live performance.

To test the network performance, the computing device configured with the simulated environment can be provided a series of messages. This could correspond with the schedule determined during the first timeframe. In some cases, this includes modifying the schedule to increase or decrease a message volume or rate. The computing device receives the series of messages, provided during a second timeframe that is different from the first timeframe, and outputs by extrapolation the simulated performance for the network or a computing device within the network.

The network can be load tested by increasing a volume or rate of the series of messages until an error is indicated from a computing device. The error might be a result of the computing device being incapable of performing the necessary transaction in a defined amount of time. Another error might indicate performance degradation of a computing device.

At the same time the error is indicated, another computing device might have capacity to process additional transactions, as indicated by its performance. Based on the error identified by the output of the simulated environment, an action can be taken to avoid experiencing an error in the live environment. For instance, in operation, messages of the transaction traffic can be diverted from the computing device that indicated the error in the simulated environment to the other computing device having identified capacity in the simulated environment. In this way, the overall system experiences and increase in performance without having to trigger the error in the live environment, thus avoiding downtime for users on the network.

It will be realized that the method previously described is only an example that can be practiced from the description that follows, and it is provided to more easily understand the technology and recognize its benefits. Additional examples are now described with reference to the figures.

Figure 1:
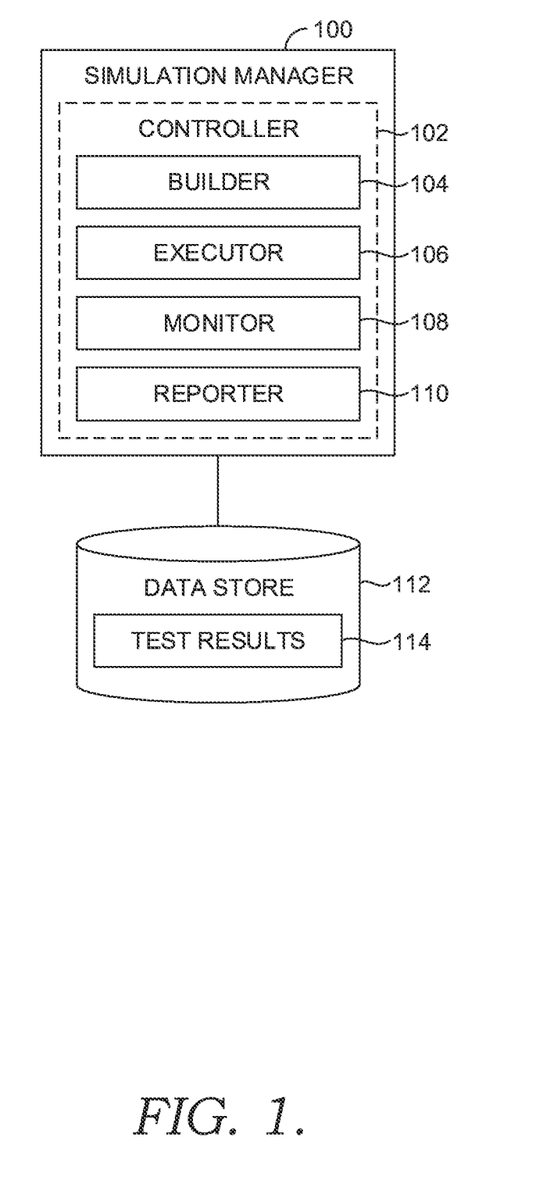
FIG. 1 is an example simulation manager for generating a simulated environment and executing a system test within the simulated operational environment, in accordance with an aspect described herein.

Turning now to FIG. 1, an example simulation manager 100 is provided and is generally suitable for generating a simulated environment and executing a system test within the simulated environment.

It should be understood that simulation manager 100 is just one example suitable for use that can be derived from the disclosure technology. It is noted that any number of components may be employed to achieve the desired functionality, and such other arrangements are intended to be within the scope of the present disclosure, as describing every combination of components and their operations is impracticable. As such, other arrangements and elements (e.g., machines, interfaces, functions, orders, and groupings of functions, etc.) can be used in addition to or instead of those shown, and some elements may be omitted altogether.

Further, many of the elements described herein are functional entities that may be implemented as discrete or distributed components or in conjunction with other components, and in any suitable combination and location. Various functions described herein as being performed by one or more entities may be carried out by hardware, firmware, or software. For instance, various functions may be carried out by a processor executing instructions stored in memory.

Having this in mind, simulation manager 100 may generate a simulated environment and execute a system test by employing controller 102, builder 104, executor 106, monitor 108, and reporter 110. Simulation manager 100 is shown communicating to data store 112 comprising test results 114. Simulation manager 100 may communicate to data store 112 using any communication method, including those described in relation to FIG. 7.

Data store 112 generally stores information including data, computer instructions (e.g., software program instructions, routines, or services), or models used in embodiments of the described technologies. Although depicted as a database component, data store may be embodied as one or more data stores or may be in the cloud. Example data stores suitable for use as data store 112 are described in more detail with regard to the discussion related to FIG. 7. As illustrated, data store 112 comprises test results 114.

Controller 102 generally binds together other functions of simulation manager 100 to perform the performance testing. Controller 102 integrates different remote components, services, and processes of a network of computing devices of a medical records system. Controller 102 may communicate with different resources, including various software components such as builder 104, executor 106, monitor, 108 and reporter 110, to perform their individual operations. That is, controller 102 may communicate with other functional components of simulation manager 100 to control and execute the components regardless of the location or arrangement of the components. This can be done using a Server Interface that is based on a Remote Desktop Management (MS RDP) Client.

Controller 102 can be configured to generate a graphical user interface to provide for display at a computing device. The graphical user interface can be used to facilitate server setup for testing performance, including servers that are associated with computing devices of the network of computing devices. For instance, the graphical user interface may include the performance of the computing devices in the network. The graphical user interface may be used to trigger testing and display results of test monitoring. The graphical user interface may be configured to receive inputs for adjusting a schedule for the test or change a message volume or rate for a simulated computing environment. In some instances, the graphical user interface may be used to divert messages from one computing device to another within the network. The graphical user interface may be configured to receive commands related to test result collection and storage.

To connect the different servers, such as the computing devises within the network, controller 102 may connect to a custom API (application programming interface) or WMI (Windows Management Instrument) system.

In some cases, controller 102 identifies transaction traffic over the network during operation of the medical records system. From the identified transaction traffic, a schedule can be determine for a first timeframe. The schedule can include the times, the traffic volume or rate, and the performance of the computing devices in the network.

When identifying transaction traffic, controller 102 may identify significant transaction types. Significant transaction types are those transaction types that are associated with a portion of a volume of the transaction traffic exceeding a transaction traffic volume threshold. The transaction traffic volume threshold may be based on the number of transaction types. In cases, the transaction traffic volume threshold is predetermined. In another case, the transaction traffic volume threshold is based on a determined percent volume of the transaction traffic and a lowest number of transaction types that can contribute to a volume of transaction traffic equal to or greater than the determined percent volume. In general, however, the transaction traffic volume threshold value can be determined based on a defined proportion of the transaction traffic volume of the transaction traffic.

Builder 104 generally defines, sets up, and customizes the resources and their configurations, as instructed by controller 102, that will be used to run a test. This may include different servers and services, the test duration, a number of concurrent users, or the message volume or rate of the transaction traffic. To set up the test, builder 104 may receive from a computing device used for initiating a test a set of test parameters, which may be a selection of various test parameter options provided at the computing device. For instance, a test parameter may include test parameter options for a type of test, message or user count, test duration, test timeframe, and so forth. Builder 104 may receive one or more selected test parameter options that are selected from among the test parameters options of the test parameters. Builder 104 may set up the test based on the selected test parameter options. This provides a user the ability to setup and execute tests without requiring the user to have an in-depth understanding of the computer engineering required to build and execute most test scenarios.

Builder 104 may comprise a test generator module that works with a test harness to provide a test scenario via controller 102. The test scenario may include increasing or decreasing a message volume of messages for one or more transaction types. This acts as a load or workflow simulation tool to update, store, and map the test scenario. Third part APIs can be utilized by builder 104 when employing the test harness. One suitable example is LoadRunner®. The test harness generally facilitates automation of the testing framework and can increase or decrease the transaction traffic volume under varying conditions and monitor the output, including computing device performance. In an implementation, builder 104 also uses a web service based mechanism to create HL7 (Health Level 7) Transactions for load generation.

Builder 104 may perform an initial health check of the computing devices within the network. This can include determining their performance, such as CPU or memory availability and usage, and determining disk health for the computing devices.

In defining and setting up resources, builder 104 may provide application server instances, application database backup/restore, initialization of the logger framework, middle tier enterprise message bus refresh/purge, event based frameworks, or operational and reporting day end batch jobs and their schedule. For instance, in providing an application server instance, builder 104 may initialize or restart a configuration of a test scenario. Builder 104 may restore the application database as part of a pre-performance simulation so that the test scenario starts from a standard point. In some cases, database backup performed by builder 104 as part of the pre-performance simulation preserves specific changes. As part of initializing the logger framework, builder 104 may backup old log files for future reference and then generate new log files by re-initializing the logging framework to set up the test scenario. For the middle tier enterprise message bus refresh/purge performed by builder 104, builder 104 may connect to a JMS (Java Messaging Service) queue and check for any messages, including message that have not been removed from the queue. Builder 104 may purge old messages not removed from the JMS queue before building the next test scenario. Further, builder 104 may schedule a batch-processing job to run during a timeframe following a particular application logic. To accomplish this, builder 104 may stop a scheduler service and override the scheduler or any task files before restarting the scheduler service.

Builder 104 may further provide an HL7 messaging engine to facilitate messaging. This may include generating a series of messages of one or more transaction types to increase or decrease a message volume or rate. HL7 messaging is one example of a messaging language that can be used to imitate messages of a particular transaction type. In some aspects, the messages are generated to match a message volume or rate associated with the first timeframe during which the schedule is determined, as previously discussed. In some implementations, builder 104 links to a document management system.

Builder 104 may modify the schedule to perform a test. That is, the message volume or rate associated with the schedule may be increased or decreased to generate a second schedule for implementation during a second timeframe that is different from the first timeframe. In some cases, the increase in message volume or rate provides for a greater transaction volume associated with the modified schedule as compared to the transaction traffic volume in the schedule determined during the first timeframe. Builder 104 can trigger HL7 messages in accordance with the modified schedule, including those that imitate particular transaction types. Messages of the series of messages may comprise those that imitate significant transaction types. In some cases, the series of messages triggered by builder 104 include only the messages associated with the significant transaction types. In one example scenario, builder 104 can trigger messages until an error is received from a computing device of the network. This can include triggering messages to increase the message volume, including increasing the message rate, until an error is received.

Builder 104 can set up the test harness to facilitate implementation of the test. This can include a container for performing text scripts with the test scenario. Builder 104 simulates a number of users on the network by generating a series of messages based on the schedule. Builder 104 may also determine the rate at which the volume of messages is delivered. This may be included as part of the modified schedule or performed by builder 104 during execution of the modified schedule. In some implementations of the technology, builder 104 creates 835 remittance files to facilitate messages of transaction types associated with financial transactions.

Executor 106 generally executes a test scenario defined and set up by builder 104. In general, executor 106 may start the test as provided by the modified schedule determined by builder 104. The test is started by executor 106 using the test harness. This can include starting the test at a time defined by the modified schedule, including providing a series of messages as determined by builder 104, including any remit messages, if any. Executor 106 may be configured to run as a background process. That is, Executor 106 may not only synchronize the resources, but may also coordinate the actions of each resource in a manner provide by a schedule based on the test scenario. While in some cases, any individual resource component may have a capability of executing functions based on a schedule, the executor 106 can provide a single umbrella to co-ordinate and execute the resources for multiple components from an end-to-end process during execution of the test scenario.

Monitor 108 is generally configured to monitor the test scenario executed by executor 106 and to send alerts, such as an indication of an error. In some cases, monitor 108 identifies the performance of the network based on an extrapolated output of the simulated performance of a computing device in response to a series of messages provided by executor 106 in accordance with the modified schedule. For instance, the simulated output may include the CPU or memory usage of a computing device as extrapolated based on the series of messages.

Monitor 108 may provide an indication of an error within the network, including an error from one or more computing devices of the network based on monitoring the test in the simulated environment. The error may occur where performance for a computing device begins to degrade. Thus, upon detecting the degradation in the performance, monitor 108 may provide the indication of the error. Another example error may occur where the computing device processes the messages over a time that is longer than a predetermined time or stops processing the messages. In such cases, monitor 108 may provide an indication of the error. At the time of the error, monitor 108 may identify another computing device of the network has performance capacity, e.g., does not exceed the threshold value of CPU usage or memory.

Controller 102 can take an action to resolve the error. In particular, during operation of the network outside of the simulated environment, for example, the live environment, controller 102 can divert messages away from the device that indicated an error during the test in the simulation. This can include diverting the messages to the computing device identified as having the performance capacity to process the transactions.

Reporter 110 generally reports the results of the test provided by monitor 108. In addition to, or in lieu of, reporting the results of the test, reporter 110 may cause the results of the test to be stored in data store 112 as test results 114.

Reporter 110 may prepare a report of the test results that includes a statistical performance, including a maximum, minimum, average, and relative percentile performance, for instance, those having performance statistics in the 90th percentile, of one or more of the computing devices of the network. Reporter 110 may compare test results to prior test results included as part of test results 114, and report a comparison between the tests. Reporter 110 may provide the test results, comparison, or statistical analyses of the test results by generating such information on a graphical user interface for presentation at a display device.

Figure 2:
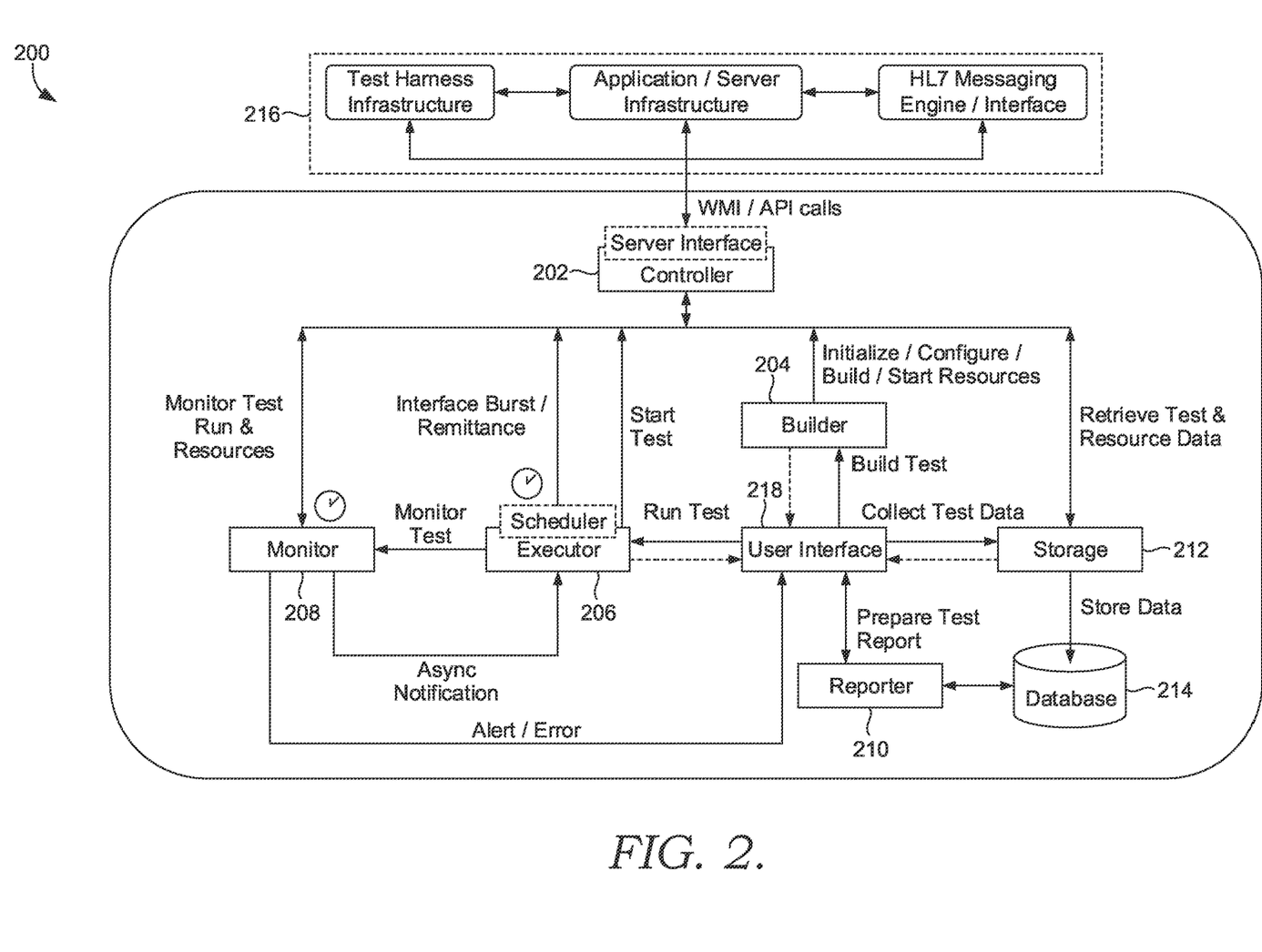
FIG. 2 is an example process flow that can be performed by the simulation manager of FIG. 1, an accordance with an aspect described herein.

Turning now to FIG. 2, an example process flow 200 that can be performed by components of simulation manager 100 of FIG. 1 is provided. Process flow 200 is being provided as one example process in which the described components can be employed. As such, it will be understood that simulation manager 100 of FIG. 1 could also be employed in other manners, and that describing all such uses would be impracticable. However, such uses of simulation manager 100 are intended to be within the scope of this disclosure, in addition to example process flow 200.

As illustrated, process flow 200 is performed using controller 202, builder 204, executor 206, monitor 208, and reporter 210. Corresponding components of FIG. 1 are suitable for use as the components within process flow 200.

Process flow 200 is further illustrated employing storage component 212 that communicates with database 214, an example of which is a SQL database, to store data generated and received by other components of process flow 200.

Controller 202 may communicate with a server interface for inputs in performing operations of a test. Controller 202 communicates with testing resources 216 that may comprise a test harness, an application or server infrastructure, and an HL7 messaging engine, as illustrated in FIG. 2. Controller 202 may communicate to testing resources 216 via WMI or API calls.

As illustrated within FIG. 2, a test scenario, which may include a series of workflows is set up by builder 204. The test scenario is set up by defining a load, such as a series of messages having a particular message volume or message rate. This simulates multiple users. In an example, a test scenario can include remittance processing, by including remittance messages in the series of messages, an inbound interface processing load, and a day-end operational processing load. Accordingly, remit files, interface transaction files, and day-end operational files are scheduled and linked with the test. Thus, for instance, a prior determined scheduled can be modified to schedule a series of messages including any combination of such files.

Builder 204 can be used to set up the testing environment by sequencing stop, start, refresh, or restore events within the schedule for the series of messages. Builder 204 can also initiate a health check of server and testing resources.

Executor 206 starts the test scenario by connecting to testing resources 216 and servers. Executor 206 starts the test scenario in accordance with the schedule provided by a scheduler determined by builder 204. Executor 206 triggers monitor 208 to begin monitoring the test scenario. Executor 206 may stop the test scenario when all of the scheduled activities are exhausted.

Once the test starts for the test scenario, monitor 208 monitors the test. For instance, monitor 208 might monitor transaction processes like patient check-in, charge posting, real-time reimbursement processing, claims generation, work listing, HL7 interface operations, and the like, or other system operations, such as interface transaction posting, failed messages in a message bus, queue backlogging, database blocking, virtual user creation or termination, ODE (operation day end) and RDE (report day end) job status or progress, record processing rate, failures, and the like. The monitoring can be based on configured criteria. Monitor 208 may provide alerts in the form of indications of errors where observed values reach certain thresholds, such as when the performance of a computing device exceeds a transaction traffic volume threshold value.

Reporter 210 analyses the test results based on the different resource usage patterns. Reporter 210 may compare the results with a baseline or earlier test result. Reporter 210 may provide the test results and analysis via a graphical user interface, illustrated as being provided at user interface 218.

Once the test completes, storage component 212 is used to collect test data, including resource data and error messages from different servers. Storage component 212 may store the test data and error messages at database 214.

Figure 3:
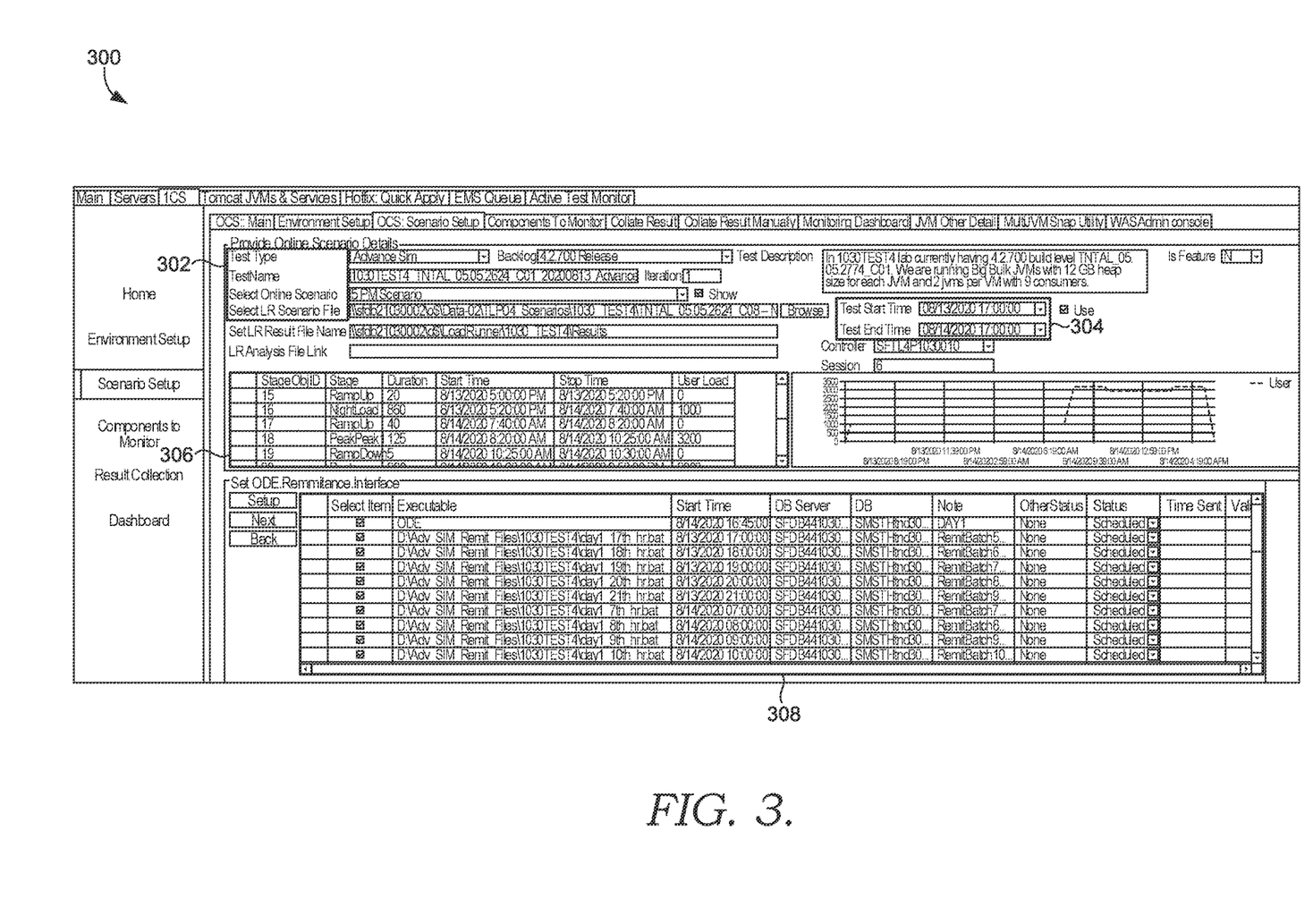
FIG. 3 is a graphical user interface generated to comprise an example arrangement of components of the simulation manager of FIG. 1.

FIG. 3 illustrates an example graphical user interface 300 that may be generated during process flow 200 of FIG. 2. Graphical user interface 300 may include a setup generated by builder 204. Graphical user interface 300 is illustrated as comprising a test type at area 302 and test times at area 304. Area 306 is provided to illustrate a schedule for a series of messages being provided to test the simulated system.

Figure 4:
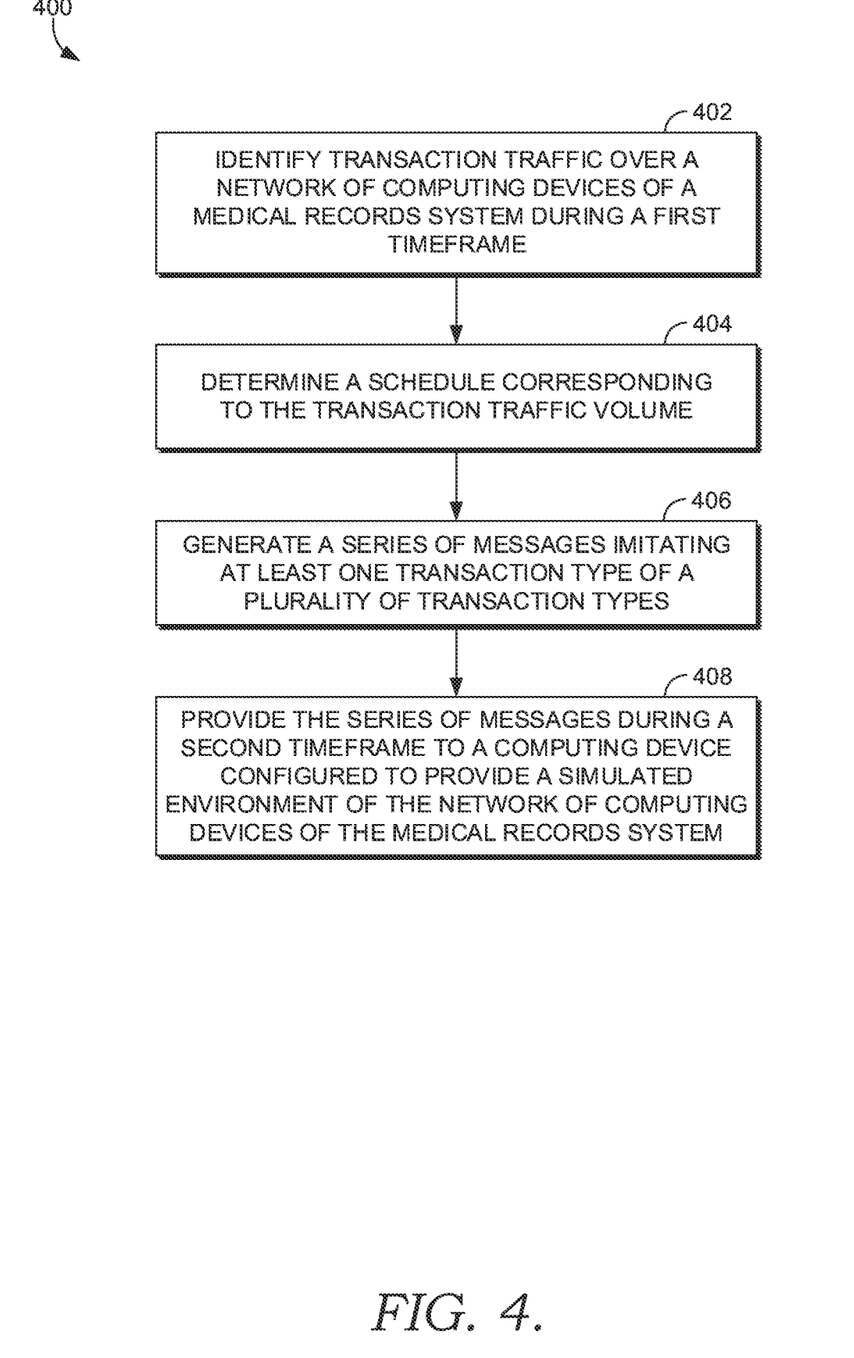
FIGS. 4-6 are block diagrams of example methods of simulating the computer environment and executing the system test within the simulated environment using the simulation manager of FIG. 1, in accordance with aspects described herein.
Figure 5:
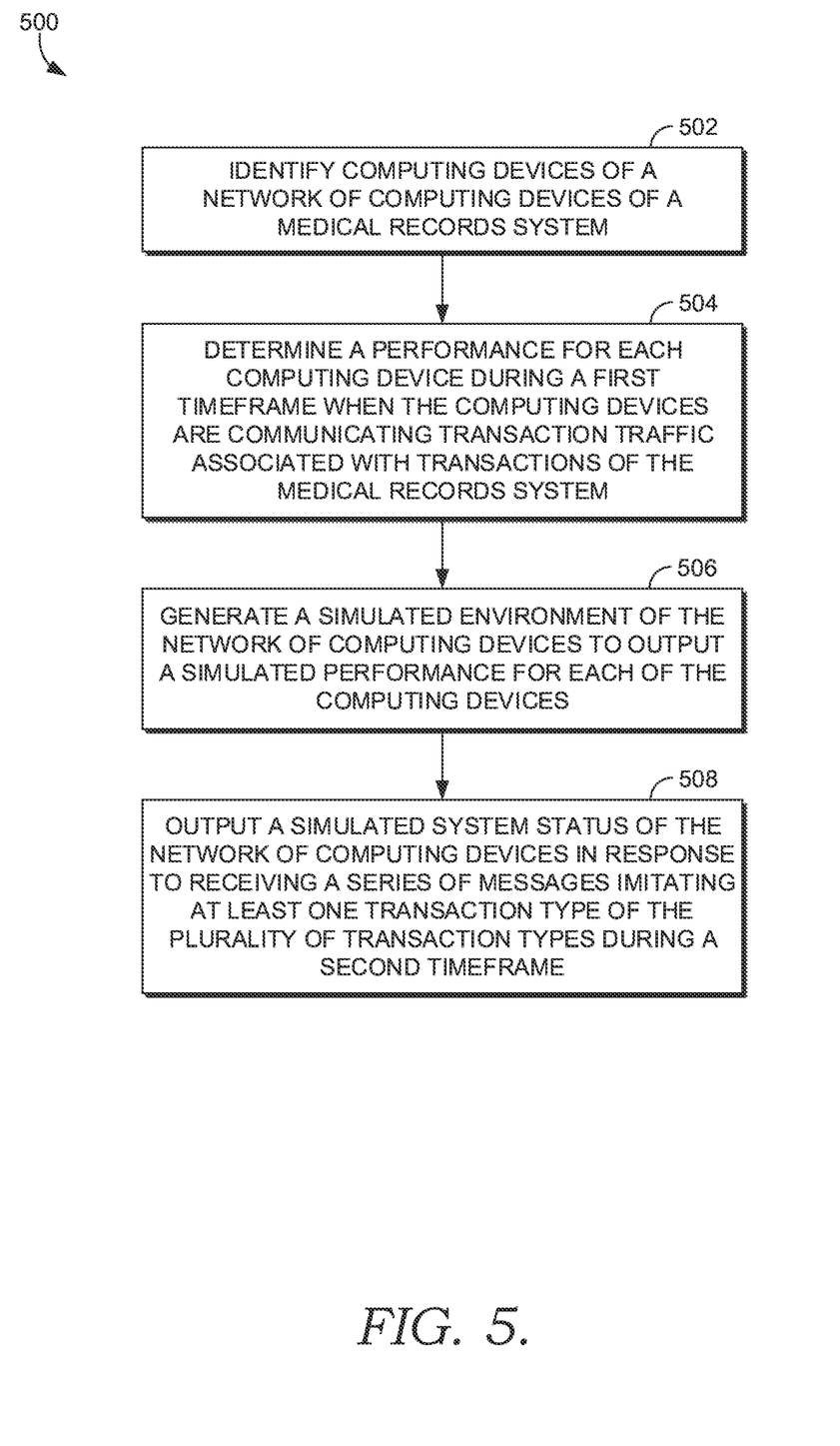
Figure 6:
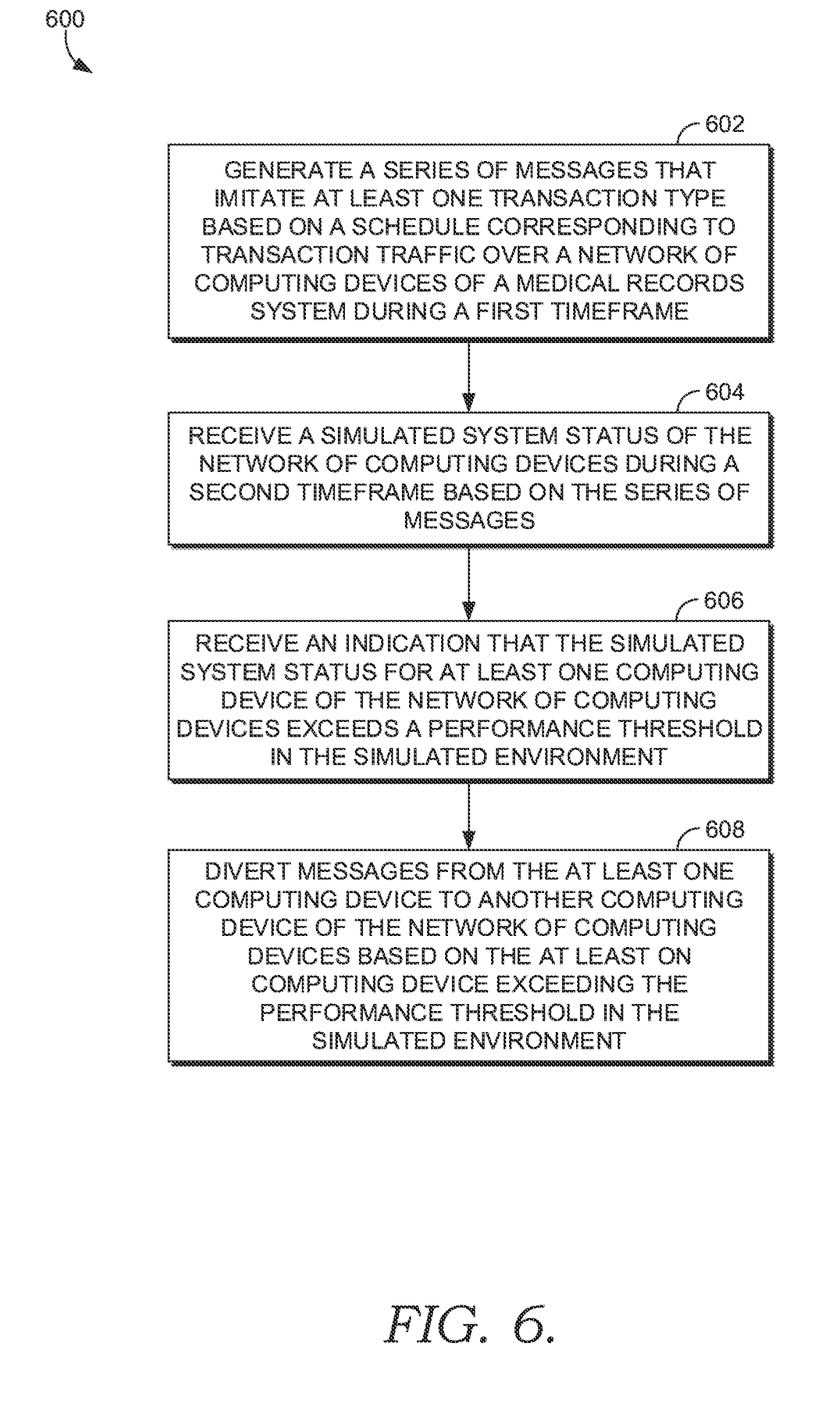

With reference to FIGS. 4-6, block diagrams are provided to illustrate methods of simulating a computer environment for system testing. The methods may be performed using simulation manager 100 described with reference to FIG. 1. In embodiments, one or more computer storage media have computer-executable instructions embodied thereon that when executed by one or more processors, cause the one or more processors to perform operations of the method.

Referring to FIG. 4, at block 402, transaction traffic over a network of computing devices of a medical records system is identified during a first timeframe. The transaction traffic may indicate transactions within a medical records system. A controller, such as controller 102, may be configured to identify transaction traffic over the network, and may do so implementing another monitoring component, such as monitor 108. The transaction traffic being identified may be associated with a plurality of transaction types, such as a transaction type related to remittance payment files, a transaction type for entries in patient charts, a transaction type for checking in a patient, and so forth. Additionally, the transaction traffic may comprise a transaction traffic volume, such as a volume of messages that is included within the transaction traffic. Thus, each transaction type maybe associated with a portion of the transaction traffic. In some cases, the transaction traffic may comprise a transaction traffic rate, or the rate at which the volume of messages is delivered. Messages may be comprised of HL7 messages, or other similar messaging protocols.

At block 404, a schedule is determined. The schedule may correspond to the transaction traffic volume during a first timeframe. That is, the schedule may indicate a transaction traffic volume or rate, at particular times during the first timeframe, thus providing a schedule of events that occurred during this time. The schedule may be determined by a builder, such as builder 104 based on the monitoring of the transaction traffic by controller 102 or another component.

At block 406, a series of messages is generated. The series of messages may be HL7 messages, or another type of messaging protocol. The series of messages can be generated by an executor, such as executor 106, based on the schedule determined for the first timeframe. Put another way, the series of messages can be generated to match the transaction traffic volume as identified in the schedule determined during the first timeframe. The generated messages can be generated to imitate a particular transaction type. The series of messages can be generated to match the transaction types identified in the schedule determined during the first timeframe.

In some cases, significant transaction types are identified. The significant transaction types can be identified when identifying the transaction traffic. The significant transaction types may be based on the portion of the volume of the transaction traffic associated with a transaction type. That is, when identifying transaction traffic, the relative portion of transaction messages that are associated with each transaction type can be identified. Significant transaction types may be those transaction types having an associated portion of transaction traffic volume that is greater than a transaction traffic volume threshold value. For instance, the transaction traffic volume threshold could be 5%, and thus, those transaction types having a portion of the transaction traffic volume that is greater than or equal to 5% of the transaction traffic volume would be significant transaction types in this example. In some cases, the transaction types that are imitated in the series of messages comprise significant transaction types. In an aspect, only significant transaction types are used within the series of messages.

At step 408, the series of messages is provided to a computing device. The computing device may be configured to provide a simulated environment of the network of computing devices. That is, when receiving messages, the computer may be configured to output the performance of one or more computing devices in the network based on performance during the first timeframe. Performance values for the one or more computing devices can be extrapolated to determine the simulated performance. By providing the series of messages to the computing device, the computing device is caused to output a simulated status of the network, i.e., the simulated status of one or more of the computing devices in the network or a combined performance of one or more of the computing devices in the network. The simulated status of the network may be provided by generation of a graphical user interface for presentation on a display device.

In some cases, the schedule is modified. For instance, modification may be done by a builder. The modification to the schedule may include an increase in the message volume or message rate. The series of messages may include additional messages based on the modification, thus increasing the message volume. The output of the computing device configured to output the performance of the network may comprise the performance of the network based on the increased message volume. The greater message volume provides for a greater transaction traffic volume experienced during a second timeframe relative to the transaction traffic volume of the first timeframe. In some cases, the messages provided with the series of messages can be increased until an indication of an error is received based on the performance of one or more of the computing devices in the network.

Turning now to FIG. 5, another example method 500 for simulating a computing environment for system testing is provided. At block 502, computing devices of a network of computing devices are identified. The computing devices may be identified using a controller or builder, such as controller 102 or builder 104. The network of computing devices may be part of a medical records system.

At block 504, a performance of each of the computing devices is determined during a first timeframe. Performance could include CPU usage, memory usage, and the like. During the first timeframe, the network of computing devices may communicate messages, which are included as part of the transaction traffic of the network. The messages of the transaction traffic may be associated with transactions of the medical records system and comprises a plurality of transaction types. Thus, each transaction type forms a portion of the transaction traffic. The transaction traffic has a transaction traffic volume, and each transaction type forms a portion of the transaction traffic volume, meaning that a portion of the transaction traffic comprises messages is associated with a transaction type, while another portion of the message may be associated with a different transaction type. One or more of the transaction types may be a significant transaction type where the portion associated with the transaction type exceeds a transaction traffic volume threshold value. A controller or monitor, such as controller 102 or monitor 108, may determine the performance of the computing devices during the first timeframe.

At block 506, a simulated environment of the network of computing devices is generated. The simulated environment may be generated buy a builder, such as builder 104, and be based on the performance of computing devices determined at block 504. The simulated computing environment may be configured to output a simulated performance of the computing devices. The simulated performance may replicate the performance of the computing device during the first timeframe for the same message volume or message rate. The simulated environment can be configured to extrapolate other performance values of the computing devices based on a message volume or message rate of a test scenario.

At block 508, a simulated status of the network is output via the simulated environment. The simulated status of the network may comprise a simulated performance for one or more of the computing devices for a test scenario or a combined simulated performance for any number of the computing devices. The simulated status of the network is output based on a series of messages imitating at least one transaction type of the plurality of transaction types, and in some cases, comprises significant transaction types or only significant transaction types. The simulated status may be based on a message volume or rate of the series of messages. The series of messages may be provided during a second timeframe that is different from the first timeframe. The series of messages may be provided based on a modified schedule. In some cases, the series of messages is provided until an indication of an error is received. The indication of the error may be based on identifying that one or more computing devices exceeds a performance threshold. A graphical user interface may be generated and comprise the simulated status, and provided to a display device for display.

In some cases, based on an indication of an error, messages may be diverted within the network of computing devices. The messages may be diverted in a live environment. The messages may be diverted from a computing device identified from the indication of the error in the simulated environment to another computing device in the network having performance capacity. The computing device having performance capacity may be identified from the simulated status.

With reference now to FIG. 6, another example method 600 for simulating a computing environment for system testing is provided. At block 602, a series of messages is generated. The series of messages can be generated to imitate at least one transaction type, and the series of messages may be generated based on a schedule or modified schedule. The series of messages may be generated based on identified transaction traffic over a network of computing devices of a medical records system. The transaction traffic may comprise messages having a plurality of transaction types, including the at least one transaction type. Each transaction type may be associated with a portion of a transaction traffic volume of the transaction traffic.

In some cases, the series of messages may be increased during a second timeframe as compared to a first timeframe from which the schedule is determined. The increased messages may be based on a modified schedule where a builder increases or decreases a number of messages based on the schedule to generate the modified schedule. In one case, the message volume or message rate is increased until an indication of an error is observed. A value of the message volume or message rate may be received and correspond to the indication of the error. This may be performed by an executor, such as executor 106, and the indication of the error may be generated by or received by the monitor monitoring the simulated environment under which a test scenario using the modified schedule is being executed. The test scenario may include a series of messages comprising significant transaction types or only significant transaction types identified based on having a portion of the transaction traffic volume that exceeds a transaction traffic volume threshold value.

At block 604, a simulated status of the network is received based on the series of messages being provided during a second timeframe. A graphical user interface may be generated to comprise the simulated status of the network and provided for display at a display device.

At block 606, an indication that the simulated status for at least one computing device of the network may be received and indicate that the at least one computing device exceeds a performance threshold in the simulated environment. The series of messages may increase in message volume or message rate until the at least one computing device exceeds the performance threshold and the indication of the error is received. The indication of the error may be received or generated by a monitor, such as monitor 108.

At block 608, messages are diverted away from the at least one computing device in a live environment based on the indication of the error. The messages may be diverted to another computing device having a performance capacity determined from the simulated status.

Figure 7:
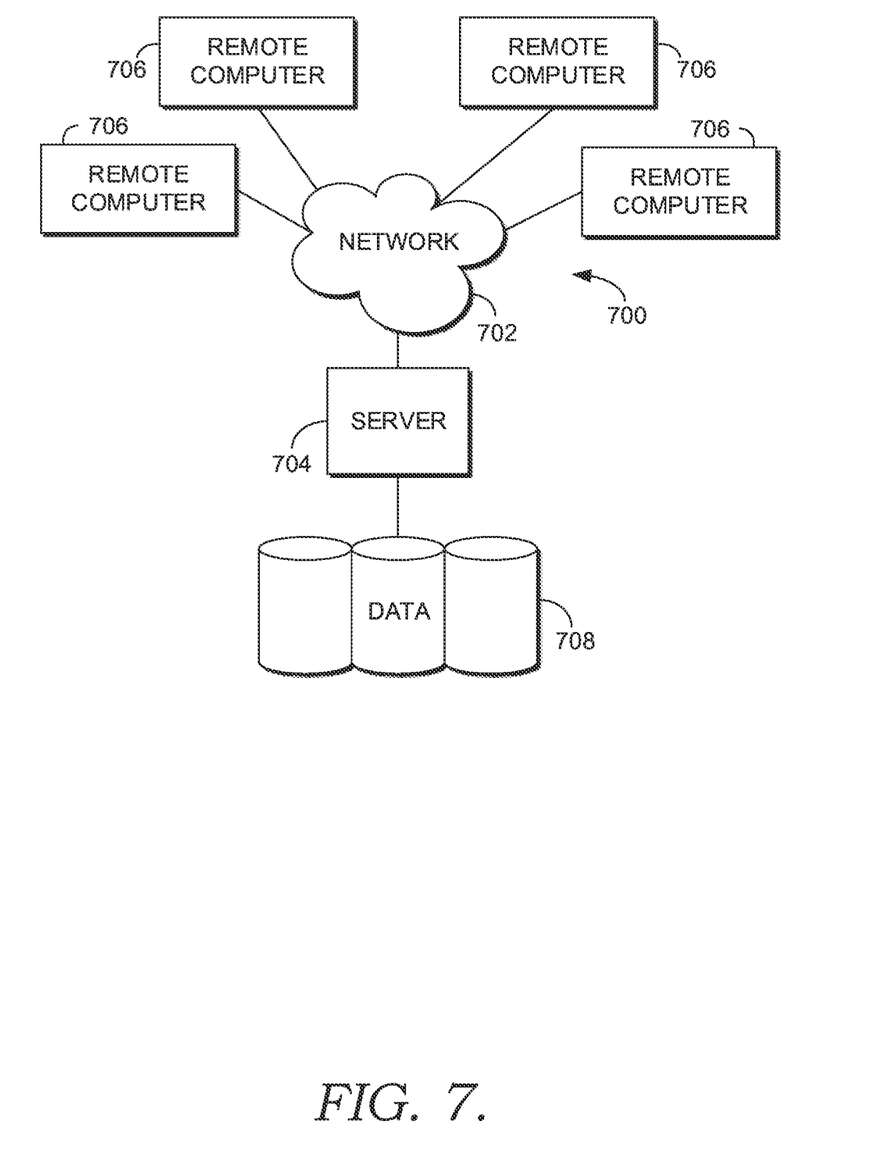
FIG. 7 is an example computing environment suitable for implementing aspects of the disclosed technology, including the simulation manager of FIG. 1, in accordance with an aspect described herein.

Having described an overview of embodiments of the present technology, an example operating environment in which embodiments of the present technology may be implemented is described below in order to provide a general context for various aspects of the present technology. Turning now to with FIG. 7, an example of a computing environment 700 is depicted, in accordance with an aspect of the present technology. It will be understood by those of ordinary skill in the art that the computing environment 700 is just one example of a suitable computing environment and is not intended to limit the scope of use or functionality of the present technology. Similarly, the computing environment 700 should not be interpreted as imputing any dependency or any requirements with regard to each component and combination(s) of components illustrated in FIG. 7. It will be appreciated by those having ordinary skill in the art that the connections illustrated in FIG. 7 are also examples as other methods, hardware, software, and devices for establishing a communications link between the components, devices, systems, and entities, as shown in FIG. 7, may be utilized in implementation. Although the connections are depicted using one or more solid lines, it will be understood by those having ordinary skill in the art that the example connections of FIG. 7 may be hardwired or wireless, and may use intermediary components that have been omitted or not included in FIG. 7 for simplicity's sake. As such, the absence of components from FIG. 7 should be not be interpreted as limiting or to exclude additional components and combination(s) of components. Moreover, though devices and components are represented in FIG. 7 as singular devices and components, it will be appreciated that some aspects may include a plurality of the devices and components such that FIG. 7 should not be considered as limiting the number of a device or component.

Continuing, the computing environment 700 of FIG. 7 is illustrated as being a distributed environment where components and devices may be remote from one another and may perform separate tasks. The components and devices may communicate with one another and may be linked to each other using a network 702. The network 702 may include wireless and/or physical (e.g., hardwired) connections. Exemplary networks include a telecommunications network of a service provider or carrier, Wide Area Network (WAN), a Local Area Network (LAN), a Wireless Local Area Network (WLAN), a cellular telecommunications network, a Wi-Fi network, a short range wireless network, a Wireless Metropolitan Area Network (WMAN), a Bluetooth® capable network, a fiber optic network, or a combination thereof. The network 702, generally, provides the components and devices access to the Internet and web-based applications.

The computing environment 700 includes a computing device 704, which may be in the form of a server, as illustrated in FIG. 7. Although illustrated as one component in FIG. 7, the present technology may utilize a plurality of local servers or remote servers in the computing environment 700. The computing device 704 may include components such as a processing unit, internal system memory, and a suitable system bus for coupling to various components, including a database or database cluster. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA®) local bus, and Peripheral Component Interconnect (PCI) bus, also known as Mezzanine bus.

The computing device 704 may include or may have access to computer-readable media. Computer-readable media can be any available media that may be accessed by computing device 704, and includes volatile and nonvolatile media, as well as removable and non-removable media. By way of example, and not limitation, computer-readable media may include computer storage media and communication media. Computer storage media may include, without limitation, volatile and nonvolatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the computing device 704. Computer storage media does not comprise signals per se.

Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

In aspects, the computing device 704 uses logical connections to communicate with one or more remote computers 706 within the computing environment 700. In aspects where the network 702 includes a wireless network, the computing device 704 may employ a modem to establish communications with the Internet, the computing device 704 may connect to the Internet using Wi-Fi or wireless access points, or the server may use a wireless network adapter to access the Internet. The computing device 704 engages in two-way communication with any or all of the components and devices illustrated in FIG. 7, using the network 702. Accordingly, the computing device 704 may send data to and receive data from the remote computers 706A-D over the network 702.

Although illustrated as remote computers 706A-D, remote computers 706A-D may be representative of one or more remote computers, including any number of remote computers. In an aspect having a distributed network, the remote computers 706A-D may be located at one or more different geographic locations. In an aspect where the remote computers 706A-D is a plurality of computing devices, each of the plurality of computing devices may be located across various locations such as buildings in a campus, medical and research facilities at a medical complex, offices or "branches" of a banking/credit entity, or may be mobile devices that are wearable or carried by personnel, or attached to vehicles or trackable items in a warehouse, for example.

In some aspects, one or more of the remote computers 706A-D is physically located in a medical setting such as, for example, a laboratory, inpatient room, an outpatient room, a hospital, a medical vehicle, a veterinary environment, an ambulatory setting, a medical billing office, a financial or administrative office, hospital administration setting, an in-home medical care environment, and/or medical professionals' offices. By way of example, a medical professional may include physicians; medical specialists such as surgeons, radiologists, cardiologists, and oncologists; emergency medical technicians; physicians' assistants; nurse practitioners; nurses; nurses' aides; pharmacists; dieticians; microbiologists; laboratory experts; genetic counselors; researchers; veterinarians; students; and the like. In other aspects, the one or more of remote computers 706A-D may be physically located in a non-medical setting, such as a packing and shipping facility or deployed within a fleet of delivery or courier vehicles.

Continuing, the computing environment 700 includes a data store 708. Although shown as a single component, the data store 708 may be implemented using multiple data stores that are communicatively coupled to one another, independent of the geographic or physical location of a memory device. Example data stores may store data in the form of artifacts, server lists, properties associated with servers, environments, properties associated with environments, computer instructions encoded in multiple different computer programming languages, deployment scripts, applications, properties associated with applications, release packages, version information for release packages, build levels associated with applications, identifiers for applications, identifiers for release packages, users, roles associated with users, permissions associated with roles, workflows and steps in the workflows, clients, servers associated with clients, attributes associated with properties, audit information, or audit trails for workflows. Exemplary data stores may also store data in the form of electronic records, for example, electronic medical records of patients, transaction records, billing records, task and workflow records, chronological event records, and the like.

Generally, the data store 708 includes physical memory that is configured to store information encoded in data. For example, the data store 708 may provide storage for computer-readable instructions, computer-executable instructions, data structures, data arrays, computer programs, applications, and other data that supports the functions and action to be undertaken using the computing environment 700 and components shown in exemplary FIG. 7.

In a computing environment having distributed components that are communicatively coupled via the network 702, program modules may be located in local or remote computer storage media including, for example only, memory storage devices. Aspects of the present technology may be described in the context of computer-executable instructions, such as program modules, being executed by a computing device. Program modules may include, but are not limited to, routines, programs, objects, components, and data structures that perform particular tasks or implement particular abstract data types. In aspects, the computing device 704 may access, retrieve, communicate, receive, and update information stored in the data store 708, including program modules. Accordingly, the computing device 704 may execute, using a processor, computer instructions stored in the data store 708 in order to perform aspects described herein.

Although internal components of the devices in FIG. 7, such as the computing device 704, are not illustrated, those of ordinary skill in the art will appreciate that internal components and their interconnection are present in the devices of FIG. 7. Accordingly, no additional details concerning the internal construction device are disclosed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology described with reference to a distributed computing environment; however, the distributed computing environment depicted herein is merely an example. Components can be configured for performing novel aspects of embodiments, where the term "configured for" or "configured to" can refer to "programmed to" perform particular tasks or implement particular abstract data types using code.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. A computerized method for simulating a computing environment for system testing, the method comprising:
   identifying transaction traffic over a network of computing devices of a medical records system during a first timeframe, the transaction traffic comprising medical record transactions being performed within the medical records system and being associated with a plurality of medical record transaction types, wherein each medical record transaction type is associated with a portion of a transaction traffic volume of the transaction traffic;
   determining a schedule corresponding to the transaction traffic volume for the first timeframe;
   generating a series of messages,
      the series of messages imitating at least a first medical record transaction type of the plurality of medical record transaction types,
      wherein the series of messages is generated to match at least a first transaction traffic volume associated with the first medical record transaction type and provided by the schedule determined for the first timeframe; and
   executing a simulation, the simulation comprising simulating the series of messages during a second timeframe in a simulated environment of the network of computing devices of the medical records system;
   based on the simulation:
      detecting an error in the simulated environment, and
      determining that the error in the simulated environment occurred as a result of at least one message of the series of messages imitating the first medical record transaction type; and
   in response to determining that the error in the simulated environment occurred as a result of the at least one message of the series of messages imitating the first medical record transaction type:
      selecting, in a live environment, a first computing device that executes medical record transactions of the first medical record transaction type, and
      diverting, in the live environment, at least a portion of transaction traffic associated with the first medical record transaction type away from the first computing device to a second computing device,
   wherein the method is performed by at least one device including a hardware processor.

2. The method of claim 1, further comprising:
   identifying significant transaction types within the plurality of medical record transaction types, wherein the significant transaction types represent an associated portion of the transaction traffic volume that meets a transaction traffic volume threshold value.

3. The method of claim 2, wherein generating the series of messages comprises:
   generating messages imitating the significant transaction types, wherein the significant transaction types comprises the first medical record transaction type.

4. The method of claim 2, wherein the transaction traffic volume threshold value is determined based on a defined proportion of the transaction traffic volume of the transaction traffic.

5. The method of claim 1, wherein the simulation further comprises:
   generating for display on a display device, a simulated status of one or more computing devices of the network of computing devices.

6. The method of claim 1, further comprising:
   providing additional messages within the series of messages imitating the first medical record transaction type to increase a message volume and simulate a greater transaction traffic volume than the transaction traffic volume during the first timeframe.

7. The method of claim 6, further comprising increasing the additional messages until the error is detected in the simulated environment.

8. The method of claim 1, wherein simulating the series of messages comprises increasing a volume of the series of messages until the error is detected.

9. The method of claim 1 further comprising selecting the second computing device for diverting data traffic away from the first computing device based on a performance capacity determined for the second computing device based on the simulation.

10. The method of claim 1, wherein the first medical record transaction type comprises modifying medical records.

11. The method of claim 1, wherein generating the series of messages comprises:
    generating a first subset of messages to match a first portion of the transaction traffic volume associated with the first medical record transaction type and provided by the schedule determined for the first timeframe, and
    generating a second subset of messages to match a second portion of the transaction traffic volume associated with a second medical record transaction type and provided by the schedule determined for the first timeframe.

12. The method of claim 11, further comprising:
    based on the simulation, detecting an available capacity associated with one or more computing devices that execute the second medical record transaction type in the simulated environment; and
    in response to detecting the available capacity in the simulated environment: diverting, in the live environment, data traffic associated with the first medical record transaction type from the first computing device to the second computing device,
    wherein the second computing device processes transaction traffic associated with (I) at least a portion of the second medical record transaction type, and (ii) at least a portion of the first medical record transaction type resulting from diverting the data traffic associated with the first medical record transaction type.

13. The method of claim 1,
    wherein detecting the error in the simulate environment comprises:
       determining that the first transaction traffic volume satisfies a first threshold value associated with the simulated environment;
    wherein diverting, in the live environment, at least a portion of transaction traffic associated with the first medical record transaction type away from the first computing device to the second computing device comprises:
  decreasing the transaction traffic associated with medical record transactions of the first medical record transaction type executed by the first computing device below a second threshold value associated with the live environment.

14. The method of claim 1,
  wherein detecting the error in the simulate environment comprises:
    determining that the first transaction traffic volume causes a performance degradation in the simulated environment;
  wherein diverting, in the live environment, at least a portion of transaction traffic associated with the first medical record transaction type away from the first computing device to the second computing device comprises:
    attaining a live performance level at least by decreasing the transaction traffic associated with medical record transactions of the first medical record transaction type executed by the first computing device.

15. The method of claim 1, further comprising:
  in response to determining that the error in the simulated environment occurred as a result of the at least one message of the series of messages imitating the first medical record transaction type:
    selecting, in the live environment, the second computing device based at least in part on an available capacity for executing medical record transactions of the first medical record transaction type, and
    diverting at least the portion of transaction traffic to the second computing device based at least in part on the available capacity for executing medical record transactions of the first medical record transaction type.

16. The method of claim 1, further comprising:
  determining that the error in the simulated environment occurred as a result of at least a portion of the schedule corresponding to medical record transactions of the first medical record transaction type;
  in response to determining that the error in the simulated environment occurred as a result of at least a portion of the schedule corresponding to medical record transactions of the first medical record transaction type:
    modifying a live-environment schedule for executing medical record transactions of the first medical record transaction type.

17. One or more non-transitory computer readable media including instructions which, when executed by one or more hardware processors, cause performance of operations comprising:
  identifying transaction traffic over a network of computing devices of a medical records system during a first timeframe, the transaction traffic comprising medical record transactions being performed within the medical records system and being associated with a plurality of medical record transaction types, wherein each medical record transaction type is associated with a portion of a transaction traffic volume of the transaction traffic;
  determining a schedule corresponding to the transaction traffic volume for the first timeframe;
  generating a series of messages,
    the series of messages imitating at least a first medical record transaction type of the plurality of medical record transaction types,
    wherein a first subset of the series of messages is generated to match at least a first transaction traffic volume associated with the first medical record transaction type and provided by the schedule determined for the first timeframe; and
  executing a simulation, the simulation comprising simulating the series of messages during a second timeframe in a simulated environment of the network of computing devices of the medical records system;
  based on the simulation:
    detecting an error in the simulated environment, and
    determining that the error in the simulated environment occurred as a result of at least one message of the series of messages imitating the first medical record transaction type; and
  in response to determining that the error in the simulated environment occurred as a result of the at least one message of the series of messages imitating the first medical record transaction type:
    selecting, in a live environment, a first computing device that executes medical record transactions of the first medical record transaction type, and
    diverting, in the live environment, at least a portion of transaction traffic associated with the first medical record transaction type away from the first computing device to a second computing device.

18. The one or more non-transitory computer readable media of claim 17, wherein the operations further comprise:
  identifying significant transaction types within the plurality of medical record transaction types, wherein the significant transaction types represent an associated portion of the transaction traffic volume that meets a transaction traffic volume threshold value.

19. The one or more non-transitory computer readable media of claim 18, wherein generating the series of messages comprises:
  generating messages imitating the significant transaction types, wherein the significant transaction types comprises the first medical record transaction type.

20. The one or more non-transitory computer readable media of claim 18, wherein the transaction traffic volume threshold value is determined based on a defined proportion of the transaction traffic volume of the transaction traffic.

21. The one or more non-transitory computer readable media of claim 17, wherein the simulation further comprises:
  generating for display on a display device, a simulated status of one or more computing devices of the network of computing devices.

22. The one or more non-transitory computer readable media of claim 17, wherein the operations further comprise:
  providing additional messages within the series of messages imitating the first medical record transaction type to increase a message volume and simulate a greater transaction traffic volume than the transaction traffic volume during the first timeframe.

23. The one or more non-transitory computer readable media of claim 22, wherein the operations further comprise increasing the additional messages until the error is detected in the simulated environment.

24. The one or more non-transitory computer readable media of claim 17, wherein simulating the series of messages comprises increasing a volume of the series of messages until the error is detected.

25. The one or more non-transitory computer readable media of claim 17, wherein the operations further comprise selecting the second computing device for diverting data traffic away from the first computing device based on a performance capacity determined for the second computing device based on the simulation.

26. A system comprising:
   at least one device including a hardware processor;
   the system being configured to perform operations comprising:
      identifying transaction traffic over a network of computing devices of a medical records system during a first timeframe, the transaction traffic comprising medical record transactions being performed within the medical records system and being associated with a plurality of medical record transaction types, wherein each medical record transaction type is associated with a portion of a transaction traffic volume of the transaction traffic;
      determining a schedule corresponding to the transaction traffic volume for the first timeframe;
      generating a series of messages,
         the series of messages imitating at least a first medical record transaction type of the plurality of medical record transaction types,
         wherein the series of messages is generated to match at least a first transaction traffic volume associated with the first medical record transaction type and provided by the schedule determined for the first timeframe; and
      executing a simulation, the simulation comprising simulating the series of messages during a second timeframe in a simulated environment of the network of computing devices of the medical records system;
      based on the simulation:
         detecting an error in the simulated environment, and
         determining that the error in the simulated environment occurred as a result of at least one message of the series of messages imitating the first medical record transaction type; and
      in response to determining that the error in the simulated environment occurred as a result of the at least one message of the series of messages imitating the first medical record transaction type:
         selecting, in a live environment, a first computing device that executes medical record transactions of the first medical record transaction type, and
         diverting, in the live environment, at least a portion of transaction traffic associated with the first medical record transaction type away from the first computing device to a second computing device.

27. The system of claim 26, wherein the operations further comprise selecting the second computing device for diverting data traffic away from the first computing device based on a performance capacity determined for the second computing device based on the simulation.

* * * * *